(12) United States Patent
Pan et al.

(10) Patent No.: US 7,557,849 B2
(45) Date of Patent: Jul. 7, 2009

(54) PROCESSOR-CONTROLLED TIMING GENERATOR FOR MULTIPLE IMAGE SENSORS

(75) Inventors: Feng F. Pan, San Jose, CA (US); Yasu Noguchi, Sunnyvale, CA (US); Young Kim, Fremont, CA (US)

(73) Assignee: Mediatek USA Inc, San Jose, CA (US)

( * ) Notice: Subject to any disclaimer, the term of this patent is extended or adjusted under 35 U.S.C. 154(b) by 612 days.

(21) Appl. No.: 10/963,494

(22) Filed: Oct. 11, 2004

(65) Prior Publication Data

US 2006/0077275 A1    Apr. 13, 2006

(51) Int. Cl.
*H04N 3/14* (2006.01)
*H04N 5/335* (2006.01)

(52) U.S. Cl. ............... 348/312; 713/500; 327/144

(58) Field of Classification Search ......... 348/230.1, 348/265, 311, 312, 223.1, 262, 264, 207.99; 327/144, 291, 293, 294, 299, 116, 172; 713/500
See application file for complete search history.

(56) References Cited

U.S. PATENT DOCUMENTS

| | | | | |
|---|---|---|---|---|
| 5,526,048 | A * | 6/1996 | Yamamoto | 348/223.1 |
| 5,532,742 | A * | 7/1996 | Kusaka et al. | 348/264 |
| 5,847,588 | A * | 12/1998 | McDermott | 327/144 |
| 6,285,399 | B1 * | 9/2001 | Tao | 348/312 |
| 6,580,456 | B1 * | 6/2003 | Jacobs | 348/312 |
| 6,617,934 | B1 | 9/2003 | Holberg et al. | 331/57 |
| 6,720,999 | B1 | 4/2004 | Holberg et al. | 348/222.1 |
| 6,788,120 | B1 * | 9/2004 | Nguyen | 327/172 |
| 6,906,562 | B1 * | 6/2005 | Nguyen | 327/116 |
| 7,019,777 | B2 * | 3/2006 | Sun | 348/263 |
| 7,131,022 | B2 * | 10/2006 | Dahlgren et al. | 713/500 |

(Continued)

FOREIGN PATENT DOCUMENTS

JP    2002-261264    9/2002

(Continued)

OTHER PUBLICATIONS

"AD9995 12-Bit CCD Signal Processor with Precision Timing Generator," Analog Devices, 2003.*

(Continued)

*Primary Examiner*—Lin Ye
*Assistant Examiner*—Dennis Hogue
(74) *Attorney, Agent, or Firm*—Imperium Patent Works; T. Lester Wallace; Zheng Jin

(57) ABSTRACT

A versatile analog front end and timing generator (AFE/TG) integrated circuit is capable of supplying horizontal and vertical timing signals to a large number of disparate image sensors. In a first novel aspect, the AFE/TG includes an output mode wherein multiple identical AFE/TGs output digitized sensor data to a single digital image processor (DIP) without intervening multiplexing circuitry. In a second novel aspect, the AFE/TG includes a processor that executes a program. Execution of the program controls the detailed timing of horizontal and vertical timing signals output from the AFE/TG. At boot time, the program is loaded into the AFE/TG via a serial bus. In a third novel aspect, the processor is clocked by a clock signal with a relatively long clock period. A DLL and associated set/reset circuitry allows the processor to generate and control timing signals with a resolution substantially greater than clock period of the processor.

9 Claims, 15 Drawing Sheets

U.S. PATENT DOCUMENTS

| | | | |
|---|---|---|---|
| 7,256,829 B2 * | 8/2007 | Kubota et al. | 348/312 |
| 7,283,169 B2 * | 10/2007 | Tanaka | 348/312 |
| 2002/0176009 A1 | 11/2002 | Johnson et al. | 348/229 |
| 2002/0191094 A1 * | 12/2002 | Curtis et al. | 348/312 |
| 2004/0095493 A1 | 5/2004 | Sakakibara | 348/303 |

FOREIGN PATENT DOCUMENTS

| WO | WO 03/088653 A1 | 10/2003 |
|---|---|---|

OTHER PUBLICATIONS

"AD9995 12-Bit CCD Signal Processor with Precision Timing Generator," Analog Devices, 2003.*

"12-Bit CCD Signal Processor with Precision Timing Generator-AD9995," Analog Devices, 2003, C04336-0-8/03 (0), 60 pages.

"Diagonal 9.04mm (Type 1/1.8) Frame Readout CCD Image Sensor with Square Pixel for Color Cameras-ICX452AQ," Sony Corporation, J02714 PS, 39 pages, 2002.

* cited by examiner

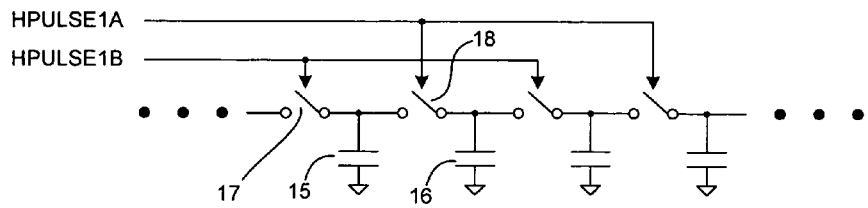
FIG. 3
(PRIOR ART)
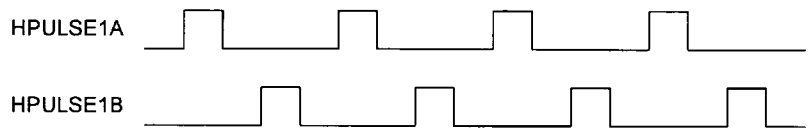
FIG. 4
(PRIOR ART)
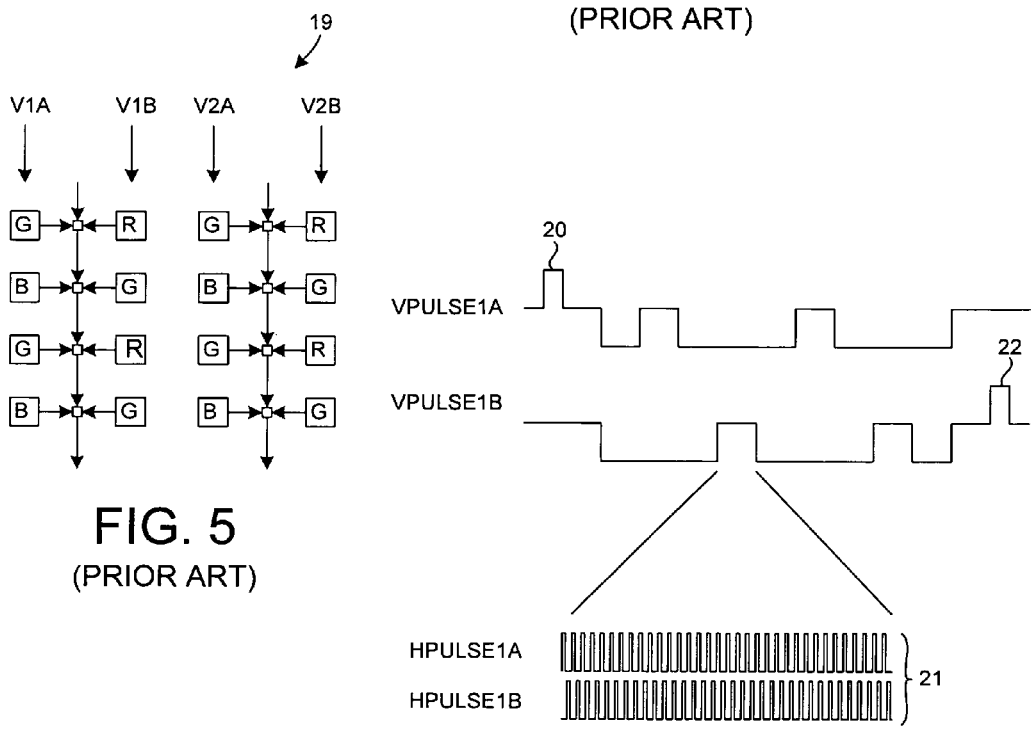
FIG. 5
(PRIOR ART)
FIG. 6
(PRIOR ART)

HIGH SPEED READOUT MODE

AFE/TG OUTPUT MODES

MODE1 = ONE VALUE (RED, GREEN OR BLUE) IS OUTPUT AS ONE 16-BIT VALUE.

MODE2 = EACH VALUE OUTPUT BY AN AFE/TG IS TRUNCATED TO FIVE BITS. THE THREE AFE/TG DEVICES ARE SYNCHRONIZED SO THAT THEY EACH OUTPUT THEIR RESPECTIVE 5-BIT OUTPUT VALUES AT THE SAME TIME IN PARALLEL.

```
#include         "TG.h"      // define constant parameters, etc.

main()
{
    until(AUX0[2]);      // Wait for INIT_EN flag.
                         // This instruction should be
                         // coded into initial code register.

init:                // The following register setup can be
                         // carried out through simple DBE register write
                         // (to SPi, AUX2 and GPi directly).
                         // This is an example to show it could also
                         // be done by the PSG.

// set H signal ranges reg.
        GP3 = (48<<6) | (63);    // set RG range, set at 48, reset at 63
        SP3 = GP3;
        GP3 = (0<<6) | (31);     // set ADCLK range, set at 0, reset at 31
        SP2 = GP3;
200 →   GP3 = (47<<6) | (16);    // set H1A/H1B range, set at 47, reset at 16
201 →   SP1 = GP3;
        GP3 = (16<<6) | (47);    // set H2A/H2B range, set at 16, reset at 47
        SP0 = GP3;

GP3 = (15<<6) | (0);     // set XSHP range, set at 15, reset at 0
        SPa = GP3;
        GP3 = (47<<6) | (32);    // set XSHD range, set at 47, reset at 32
        SPb = GP3;

// set H enable reg.
        AUX3 ^= AUX3;

// set default V signal values
        GP0 = 1<<8 | 1<<6 | 1<<5 | 1<<2 | 1<<1 | 1<<0;
        GP1 = 1<<6;

done;
    last: nop;
}
```

FIG. 16A

```
#define    H2      (1<<0)
#define    H1      (1<<1)
#define    ADCLK   (1<<2)
#define    RG      (1<<3)
#define    XSHP    (1<<10)
#define    XSHD    (1<<11)

#define    V1      (1<<0)
#define    V3A     (1<<1)
#define    V3B     (1<<2)
#define    V5A     (1<<3)
#define    V5B     (1<<4)
#define    V2      (1<<5)
#define    V4      (1<<6)
#define    V6      (1<<7)
#define    HD      (1<<8)

#define    SUB     (1<<5)
#define    VD      (1<<6)
```

202 → main()
{

203 →     until(AUX0[0]);      // wait for P_EN flag
            // This instruction should be
            // coded into initial code register.

204 →     GP3 = ADCLK|H1|H2|RG|XSHP|XSHD;   // enable H signals
205 →     AUX3 |= GP3;
            // all above can be pre-set by DBE // Regular CCD/CMOS sensors flush can be added later.
    // Assume all the signals are with their default values
    // such as insert a separate flush frame before the normal P.

line_1:
206 →         GP0 ^= VD;      // set VD
207 →         call dataout_line;   // line 1, dummy line
        nop;

line_2:
        nop;
        nop;
209 →         call readout_line;    // line 2
214 →         RGP3 = 6;      // line cnt line_3_9:
        nop;
        nop;
216 →         call dataout_line;    // line 3-9
215 →         while(RGP3--) goto line_3_9;

FIG. 16B

```
                line_10:
                    nop;
217 →               GP0 ^= VD;        // reset VD
                    call dataout_line;  // line 10
                    RGP3 = 213;       // line cnt line_11_224:
                    nop;
                    nop;
                    call dataout_line;  // line 11-224
                    while(RGP3--) goto line_11_224;

218 →           if (AUX0[0]) goto line_1; // jump back to preview if
                                    // P_EN is not cleared by DBE
                done;               // done if P_EN is cleared //////////////////////////////////
                ///// subroutines
                //////////////////////////////////

208 →   dataout_line:
            // pixel readout part
            GP1 ^= HD;       // at 0, set HD(HR)
211 →       delay(42);       // at 1
212 →       AUX3 ^= (H1^H2); // at 43, reset H1/H2, will take effect at 44
            GP0 ^= (V5A^V5B);// at 44, set V5
            delay(25);       // at 45
            GP0 ^= V1;       // at 70, set V1
            delay(25);       // at 71
            GP0 ^= V6;       // at 96, set V6
            delay(25);       // at 97
            GP0 ^= V2;       // at 122, set V2
            delay(25);       // at 123
            GP0 ^= V1;       // at 148, reset V1
            delay(25);       // at 149
            GP0 ^= (V3A^V3B);// at 174, set V3A/V3B
            delay(25);       // at 175
            GP0 ^= (V2^HD);      // at 200, reset V2, HD
            delay(25);       // at 201
            GP0 ^= V4;       // at 226, set V4
            delay(25);       // at 227
            GP0 ^= (V3A^V3B);// at 252, reset V3A/V3B
            delay(25);       // at 253
            GP0 ^= (V5A^V5B);// at 278, reset V5
            delay(25);       // at 279
            GP0 ^= V4;       // at 304, reset V4
            delay(25);       // at 305
            GP0 ^= V6;       // at 330, reset V6
            delay(25);       // at 331
            GP0 ^= (V5A^V5B);// at 356, set V5
            delay(25);       // at 357
```

FIG. 16C

```
GP0 ^= V1;        // at 382, set V1
    delay(25);        // at 383
    GP0 ^= V6;        // at 408, set V6
    delay(7);         // at 409
    GP1 ^= SUB;       // at 416, set SUB
    delay(17);        // at 417
    GP0 ^= V2;        // at 434, set V2
    delay(25);        // at 435
    GP0 ^= V1;        // at 460, reset V1
    delay(25);        // at 461
    GP0 ^= (V3A^V3B); // at 486, set V3A/V3B
    delay(17);        // at 487
    GP1 ^= SUB;       // at 504, reset SUB
    delay(7);         // at 505
    GP0 ^= V2;        // at 512, reset V2
    delay(25);        // at 513
    GP0 ^= V4;        // at 538, set V4
    delay(25);        // at 539
    GP0 ^= (V3A^V3B); // at 564, reset V3A/V3B
    delay(25);        // at 565
    GP0 ^= (V5A^V5B); // at 590, reset V5
    delay(25);        // at 591
    GP0 ^= V4;        // at 616, reset V4
    delay(25);        // at 617
    GP0 ^= V6;        // at 642, reset V6
    delay(25);        // at 643
    GP0 ^= (V5A^V5B); // at 668, set V5
    delay(25);        // at 669
    GP0 ^= V1;        // at 694, set V1
    delay(25);        // at 695
    GP0 ^= V6;        // at 720, set V6
    delay(25);        // at 721
    GP0 ^= V2;        // at 746, set V2
    delay(25);        // at 747
    GP0 ^= V1;        // at 772, reset V1
    delay(25);        // at 773
    GP0 ^= (V3A^V3B); // at 798, set V3A/V3B
    delay(25);        // at 799
    GP0 ^= V2;        // at 824, reset V2
    delay(25);        // at 825
    GP0 ^= V4;        // at 850, set V4
    delay(25);        // at 851
    GP0 ^= (V3A^V3B); // at 876, reset V3A/V3B
    delay(25);        // at 877
    GP0 ^= (V5A^V5B); // at 902, reset V5
    delay(25);        // at 903
    GP0 ^= V4;        // at 928, reset V4
    delay(25);        // at 929
    GP0 ^= V6;        // at 954, reset V6
    delay(24);        // at 955
213 → AUX3 ^= (H1^H2); // at 979, set H1/H2, will take effect at 980
```

FIG. 16D

```
// final delay
    GP3 = 2645;      // at 980
    while (GP3--);
    return;          // at 3627, leave 4 cycles for other op.

219 →  readout_line:
    // CCD readout part
    GP1 ^= HD;       // at 0, set HD(HR)
    GP3 = 197;       // at 1
    while (GP3--);
    GP0 ^= HD;       // at 200, reset HD
    GP3 = 1885;      // at 201
    while (GP3--);
    GP0 ^= (V5A^V5B);// at 2088, set V5
    delay(26);       // at 2089
    GP0 ^= V1;       // at 2115, set V1
    delay(28);       // at 2116
    GP0 ^= V6;       // at 2144, set V6
    delay(55);       // at 2145
    GP1 ^= V3A;      // at 2200, set V3A_T
    delay(41);       // at 2201
    GP0 ^= V2;       // at 2242, set V2
    delay(40);       // at 2243
    GP1 ^= V3A;      // at 2283, reset V3A_T
    delay(41);       // at 2284
    GP0 ^= V1;       // at 2325, reset V1
    delay(27);       // at 2326
    GP0 ^= (V3A^V3B);// at 2353, reset V3A/V3B
    delay(27);       // at 2354
    GP0 ^= V2;       // at 2381, reset V2
    delay(58);       // at 2382
    GP1 ^= V5A;      // at 2440, set V5A_T
    delay(41);       // at 2441
    GP0 ^= V4;       // at 2482, set V4
    delay(40);       // at 2483
    GP1 ^= V5A;      // at 2523, reset V5A_T
    delay(69);       // at 2524
    GP0 ^= (V3A^V3B);// at 2593, reset V3A/V3B
    delay(26);       // at 2594
    GP0 ^= (V5A^V5B);// at 2620, reset V5
    delay(28);       // at 2621
    GP0 ^= V4;       // at 2649, reset V4
    delay(26);       // at 2650
    GP0 ^= V6;       // at 2676, reset V6

// final delay

GP3 = 948;       // at 2677
    while (GP3--);
    return;          // at 3627, leave 4 cycles for other op.

last: nop;

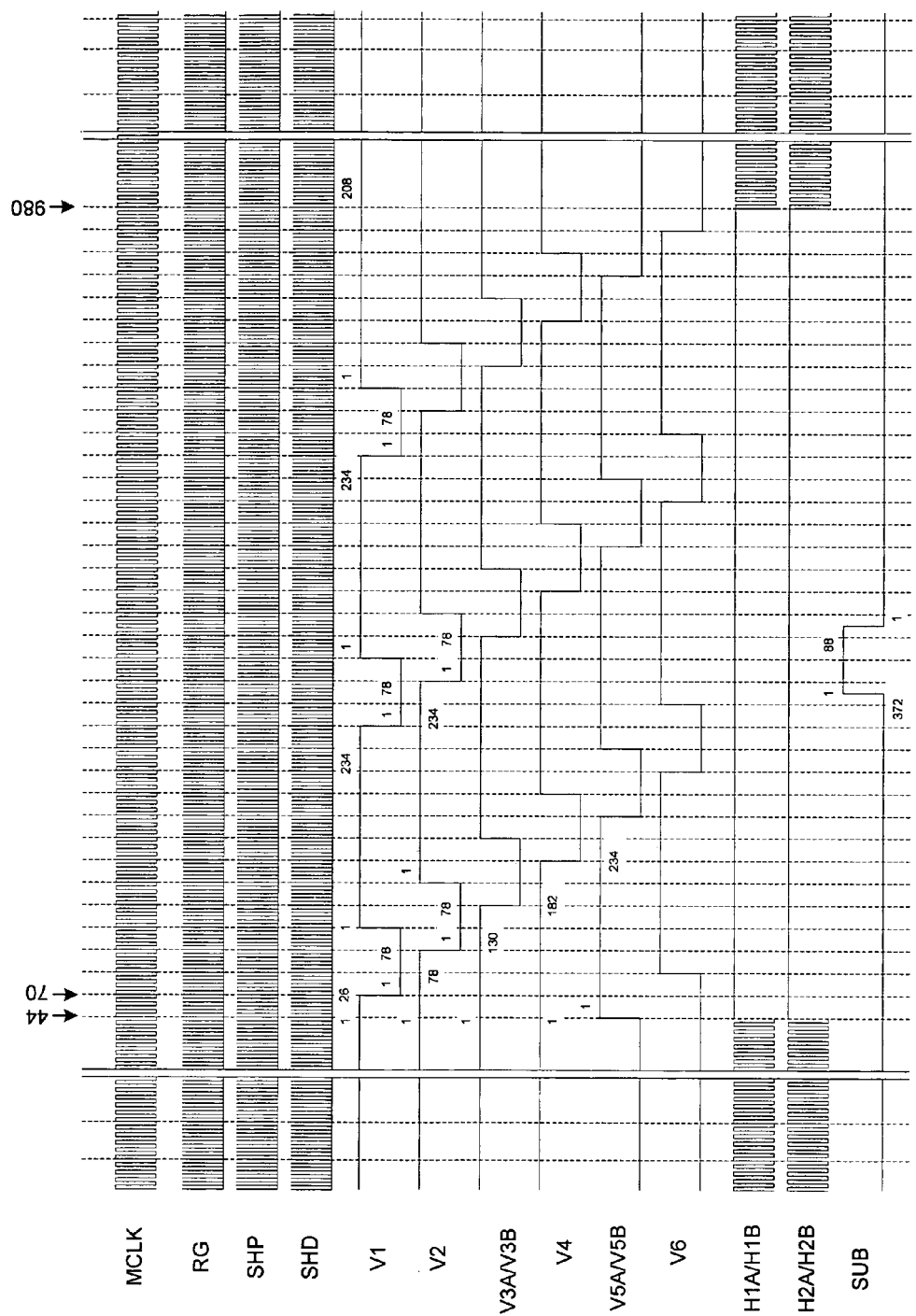

PROCESSOR-CONTROLLED TIMING GENERATOR FOR MULTIPLE IMAGE SENSORS

TECHNICAL FIELD

The present invention relates to timing generators that supply timing signals to image sensors.

BACKGROUND

FIG. 1 (Prior Art) is a simplified diagram of a consumer market digital still camera 1. An image passes through lens 2 and is captured by an image sensor 3. Image sensor 3 may, for example, be a charge coupled device (CCD) sensor or a CMOS sensor or another type of sensor. In the present example, the sensor is a CCD sensor. An analog front end (AFE) and timing generator (TG) integrated circuit 4 supplies vertical pulse signals (VPULSE signals) and horizontal pulse signals (HPULSE signals) to sensor 3 such that the sensor data (CCD OUT) is read out of the sensor and is transferred to the AFE/TG 4. CCD sensor 3 requires vertical pulse signals whose voltage minimums and voltage maximums are outside the voltage range that can be supplied by the AFE/TG integrated circuit. The vertical pulse signals VPULSE output from the AFE/TG integrated circuit are therefore supplied to a vertical driver 5 that performs level shifting to the voltage levels required by the CCD sensor 3.

AFE/TG integrated circuit 4 digitizes the image data received from the sensor and passes the digitized image data to a digital image processing (DIP) integrated circuit 6. The digitized image data is denoted DOUT. DIP 6 performs image processing on the image data and then typically stores the image in digital form in mass storage 7. The information may, for example, be stored as a digital file. DIP 6 also causes the image to be displayed on a display 8. A microcontroller 9 provides overall key scanning, control and configuration functions for the camera. Microcontroller 9 is coupled to DIP 6 via a serial bus. Microcontroller 9 controls lens 2 via motor driver circuitry 10.

FIG. 2 (Prior Art) is a simplified diagram of a primitive COD image sensor 11. COD image sensor 11 includes a two-dimensional array of sensors. In the illustration, the sensors are denoted as squares, where each square contains a letter. A square that contains a "G" is a sensor for green. A square that contains an "R" is a sensor for red. A square that contains a "B" is a sensor for blue. Reference numeral 12 identifies one such sensor for green. In response to a shutter signal, each of the sensors takes a sample. The sample is retained in the sensor in the form of a charge. The magnitude of the charge indicates the sample value. The charge values are read out of COD sensor 11 in serial fashion by supplying horizontal pulse signals and vertical pulse signals to the COD sensor. Each sensor has an associated storage element located to its left. Reference numeral 13 identifies the storage element for sensor 12. At one time, the sample charges from all the sensors are transferred right to left into the associated storage elements. A vertical pulse signal is then applied to COD sensor 11. This causes the sample charge in each storage element to be shifted down to the storage element below it. The sample charge in the bottom-most row of storage elements passes into a row 14 of storage elements at the bottom of the sensor. Once this row 14 contains a set of charges, a plurality of horizontal pulses is applied to COD sensor 11. These horizontal pulses cause the sample charges in the storage elements of row 14 to be shifted out of the COD sensor one-by-one. When the complete row of sample charges has been shifted out of COD sensor 11, then another vertical pulse is applied to load row 14 with the next row of sample charges to be read out. This process of supplying a vertical pulse, and then shifting out the bottom row of sample charges is repeated until all the sample charges are read out of COD sensor 11.

FIG. 3 (Prior Art) is a simplified diagram that illustrates an operation of row 14 of storage elements. To transfer a charge from storage element 15 to storage element 16, switch 17 is opened and switch 18 is closed. This allows charge from storage element 15 to pass through conductive switch 18 and into storage element 16. It is therefore seen that adjacent switches in the row are opened and closed in alternating fashion to shift a sample charge down the row of storage elements. It is to be understood that FIG. 3 is a very simplified diagram presented here for background information.

FIG. 4 (Prior Art) illustrates the alternating fashion of pulses in the two horizontal pulse signals HPULSE1A and HPULSE1B that control the row of switches of FIG. 3.

FIG. 5 (Prior Art) is a simplified diagram of a slightly more complex CCD sensor 19. In CCD sensor 19, each successive pair of columns of sensors shares a column of storage elements. Columns V1A and V1B share one column of storage elements. Columns V2A and V2B share a second column of storage elements.

FIG. 6 (Prior Art) illustrates the vertical pulse signals VPULSE1A and VPULSE1B used to read the sensor samples out of the array. First, the left column of sensors of each successive pair of columns is to be read out. The right column of sensors of each pair is not read out. The initial high pulse 20 of VPULSE1A with no such high pulse of VPULSE1B indicates that the left column of sensors is to transfer a column of sample charges to the center column of storage elements. Once this transfer occurs, the VPULSE1A and VPULSE1B alternate as in FIG. 4 to shift the sample charges down in the vertical dimension. After each such vertical shift, a complete set 21 of horizontal shift pulses of HPUSEL1A and HPULSE1B shifts out the bottom row of storage elements of the sensor.

Once this left half of the image frame has been shifted out, then a high pulse 22 on VPULUSE1B causes the right column of sensors of each pair of sensor columns to transfer their sample charges to the shared column of storage elements. The process repeats with each vertical shift being followed by a set 21 of horizontal shift pulses. In this way, sample charges from sensors in the right column of each pair of sensor columns is read out of CCD sensor 19. It is therefore seen that more complex vertical and horizontal shift pulses are required for a CCD sensor having such shared columns of storage elements.

The state of the art in CCD image sensors has advanced well beyond the simple examples set forth in FIGS. 2-6. Sensors typically have multiple modes including, for example, a high frame rate readout mode, an autoexposure and autofocus mode, and a capture mode. As a result, quite complex timing signals are often required to drive contemporary CCD sensors. The high frame rate readout mode may, for example, be used in a hybrid camera when the hybrid camera is used to capture video, whereas the higher resolution capture mode may be used when the hybrid camera is used to take still pictures.

FIG. 7 (Prior Art) illustrates a CCD sensor 23 that requires somewhat more complex timing signals. CCD sensor 23 has a high-speed readout mode wherein pixel mixing is performed. To increase the readout rate of a pixel image, only some of the image sensor samples captured may be read out of the sensor. This reduces the amount of information to be output from the sensor and therefore decreases readout time, but it may cause an undesirable amount of image degradation. If only a subset of the sample charges are output, then image information captured in the other unused local sensors will not be present in the image data as the image data is output from the sensor. Rather than failing to include this image information in the high readout speed mode image, an improved high-speed readout mode image may be had by mixing samples for the local set of sensors, and then shifting out the mixed result. Arrows 24 and 25 illustrate a mixing of two green sensor samples in the top row of sensors. Similarly, arrows 26 and 27 illustrate a mixing of two blue sensor samples in the second row of sensors. At a later stage, vertical mixing may take place as illustrated by arrows 28 and 29. Rather than simply outputting one sample charge from one sensor of a group of sensors and ignoring the sample charges output by other sensors of the group, the sample charges of all the sensors of the group are mixed (using both horizontal and vertical mixing) to improve the quality of the high frame rate readout image.

FIG. 8 (Prior Art) illustrates the more complex timing pulses required to perform this readout. High pulses 30 and 31 on both vertical pulse signals VPULSE1A and VPULSE1B at the same time indicates the horizontal sample mixing operation. The horizontally mixed sample charges, once in the center column of storage elements, are shifted down as set forth above in connection with FIG. 5 by the alternating pulse trains on VPULSE1A and VPULSE1B. Following each vertical shift, a sequence of horizontal shifts of HPULSE1A and HOPULSE1B shifts a mixed row of sample charges out of the CCD sensor.

Due to the complexity of the timing signals required by a typical contemporary CCD sensor, a CCD sensor manufacturer typically also supplies a compatible timing generator integrated circuit for use with the CCD sensor. Accordingly, each CCD sensor typically has its own specific timing generator. This solution to supplying a circuit for generating the needed timing signals can work well in situations where a camera design is only to include one possible type of CCD sensor. For situations in which a choice of any one of multiple different CCD sensors is to be used, however, an AFE/TG integrated circuit having a programmable timing generator is available.

FIG. 9 (Prior Art) is a simplified diagram that illustrates how complex timing signals can be defined in such an AFE/TG. First, a set of signal patterns is defined. In the illustration, VPAT0 is a first pattern, and VPAT1 is a second pattern. Each pattern defines transitions for signals. In the example illustrated, the signals are vertical pulse signals V1-V4. Sequences are then built from the patterns. In the illustration, V-SEQUENCE0 involves repeating VPAT0 N times. V-SEQUENCE1 involves starting with VPAT0 and then ending with VPAT1. The sequences are then associated with different readout regions and fields. A field may contain multiple regions. A different sequence can, for example, be associated with each region where each sequence defines a unique pulse pattern. A typical still digital camera may, for example, require a first field timing for a draft mode, a second field timing for an autofocus mode, and three different field timings for an ordinary image capture mode. During camera operation, a value loaded into a mode register selects which field timing is active, depending on how the camera is being used. For one particular example of a AFE/TG integrated circuit made for use with different CCD sensors, see the "AD9995 12-Bit CCD Signal Processor With Precision Timing Generator" data sheet, Analog Devices Inc., 36 pages, Rev. 0, copyright 2003 (the subject matter of which is incorporated herein by reference).

FIG. 10 (Prior Art) illustrates how three such AFE/TGs 32-34 can be used in a digital still camera. Each AFE/TG receives CCD data from its own CCD image sensor. There is an image sensor for red, one for green and one for blue. AFE/TG 32 supplies a 16-bit red pixel output value to DIP 35 via 16-bit bus 36, multiplexing circuitry 37, and 16-bit bus 38. Next, AFE/TG 33 supplies a 16-bit green pixel output value to DIP 35 via 16-bit bus 39, multiplexing circuitry 37, and 16-bit bus 38. Next, AFE/TG 34 supplies a 16-bit blue pixel output value to DIP 35 via 16-bit bus 40, multiplexing circuitry 37, and 16-bit bus 38. This order of outputting pixel values in the order red, green, blue, red, green, blue etc. continues pixel value by pixel value until all the pixel values of the frame have been transferred to DIP 35.

The architecture of this type of AFE/TG is flexible and works in several applications with several difference CCD sensors. Its programming and operation is, however, somewhat idiosyncratic making it difficult to use. Moreover, there are timing signal requirements and other functionalities and operating modes that the AFE/TG design does not support. For example, stability control may require changing the number of pulses in certain timing signals from one frame to the next when video is being captured. Only a portion of the CCD sensor may be used when taking video. This portion may shift around within the CCD sensor as the user inadvertently moves the camera when taking video. This shifting from frame to frame may introduce undesired jitter into the video. So that the jitter is not seen, it may be desired to change the timing signals supplied to the sensor so that the area of the sensor being used does not appear to shift from one frame to the next. The AFE/TG does not, however, have an ability to receive stability control information on a frame-by-frame basis such that the AFE/TG can generate stability-corrected timing signals that are modified on a frame-by-frame basis. If such a stability control feature were to be supported, then the AFE/TG design would have to be modified. This stability feature is but one feature not supported by the AFE/TG design. Accordingly, as CCD sensors advance in complexity and as CCD sensor timing signal requirements proliferate, the AFE/TG will probably have to be changed over and over through the years in order for the AFE/TG to be able to generate all the timing signals needed to drive the new CCD sensors.

SUMMARY

A versatile analog front end and timing generator (AFE/TG) integrated circuit is capable of supplying horizontal timing signals, vertical timing signals, and other timing and control signals to a selected one of a large number of disparate image sensors.

In a first novel aspect, the AFE/TG includes an output mode wherein multiple identical AFE/TGs output digitized sensor data to a single digital image processor (DIP) without intervening multiplexing circuitry. Rather than outputting digitized sample values in the form of longer words, each AFE/TG outputs digitized sample values that are truncated down to five bits. Each AFE/TG outputs its five-bit sample value onto a different five lines of a parallel bus. The parallel bus communicates the digitized five-bit values in parallel to the DIP. Because each AFE/TG drives a different set of bus lines, loading on the bus lines is kept to a minimum, thereby facilitating high-speed communication. Only one AFE/TG can be started at a time. Special synchronization functionality is provided so that AFT/TGs that are already operating can begin to start working synchronously with respect to one another.

In addition to this output mode, the AFE/TG also has another output mode for use in situations where only one CCD sensor is used and only one AFE/TG is provided. In this other output mode, successive digitized sensor data words are output to the DIP as complete words in parallel form over the parallel bus.

In a second novel aspect, an AFE/TG includes a processor that executes a program. The program is stored in program memory on the AF/TG. Execution of the program controls the detailed timing of horizontal and vertical timing signals output from the AFE/TG. At boot time, the program is loaded via a serial bus into the program memory within the AFE/TG. Once loaded, the processor can be enabled via the serial interface and made to execute the newly loaded program. In one example, the instruction set of the processor is such that virtually all the instructions in the processor's instruction set are executed in just one clock cycle. Having the processor execute one instruction per clock cycle facilitates tracking execution of the processor through a waveform of horizontal and vertical timing signals, where the waveform is synchronous with the clock cycle. Having the processor execute one instruction per clock cycle facilitates writing code that controls horizontal and vertical timing signals that are synchronous with the clock signal.

The AFE/TG may include one or more registers for communicating information between a device on the serial bus (for example, a microcontroller) and the AFE/TG. The device on the serial bus can, for example, write information into the registers via the serial bus and the serial bus interface of the AFE/TG. The processor is programmed to access the information in the registers and to take appropriate action based on that information. In one example, information is passed to the AFE/TG on a frame-by-frame basis. The AFE/TG uses that information to adjust timing signals supplied to the image sensor such that video being captured is stabilized. This communication technique is employed to combat jitter introduced due to a user of the camera moving during the capture of video.

In a third novel aspect, the processor of the AFE/TG is clocked by a clock signal that has a relatively long clock period. The AFE/TG further includes a timing generator. The timing generator includes a delay locked loop (DLL) circuit and an associated set/reset circuit. The processor sets up the timing generator by writing to registers within the horizontal timing generator. Once the timing generator is set up, the processor enables the timing generator such that it outputs a timing signal in accordance with the set up information defined by the processor. The DLL and set-reset circuit allow the processor to generate timing signals with a resolution substantially greater than the processor clock period.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 3 (Prior Art) is a simplified diagram that is illustrative of circuitry within the CCD image sensor of FIG. 2.

FIG. 4 (Prior Art) is a diagram of waveforms that cause the circuitry of FIG. 3 to shift sample charges.

FIG. 5 (Prior Art) is a simplified diagram of a more involved CCD image sensor wherein columns of the sensor share storage cell and vertical transfer line resources.

FIG. 6 (Prior Art) is a diagram of waveforms that cause the circuitry of FIG. 5 to shift sample charges in the vertical and horizontal directions.

FIG. 16 is a software source code program that executes on the processor of the AFE/TG integrated circuit of FIG. 12. Typically such a program is compiled by a compiler fashioned for the instruction set of the processor, and then the resulting object code is loaded into the program memory of the AFE/TG via a serial bus interface.

FIG. 17 is a waveform diagram of vertical and horizontal timing signals generated when the code of FIG. 16 is executed by the processor of the AFE/TG of FIG. 13.

DETAILED DESCRIPTION

Reference will now be made in detail to some embodiments of the invention, examples of which are illustrated in the accompanying drawings.

Figure 11:
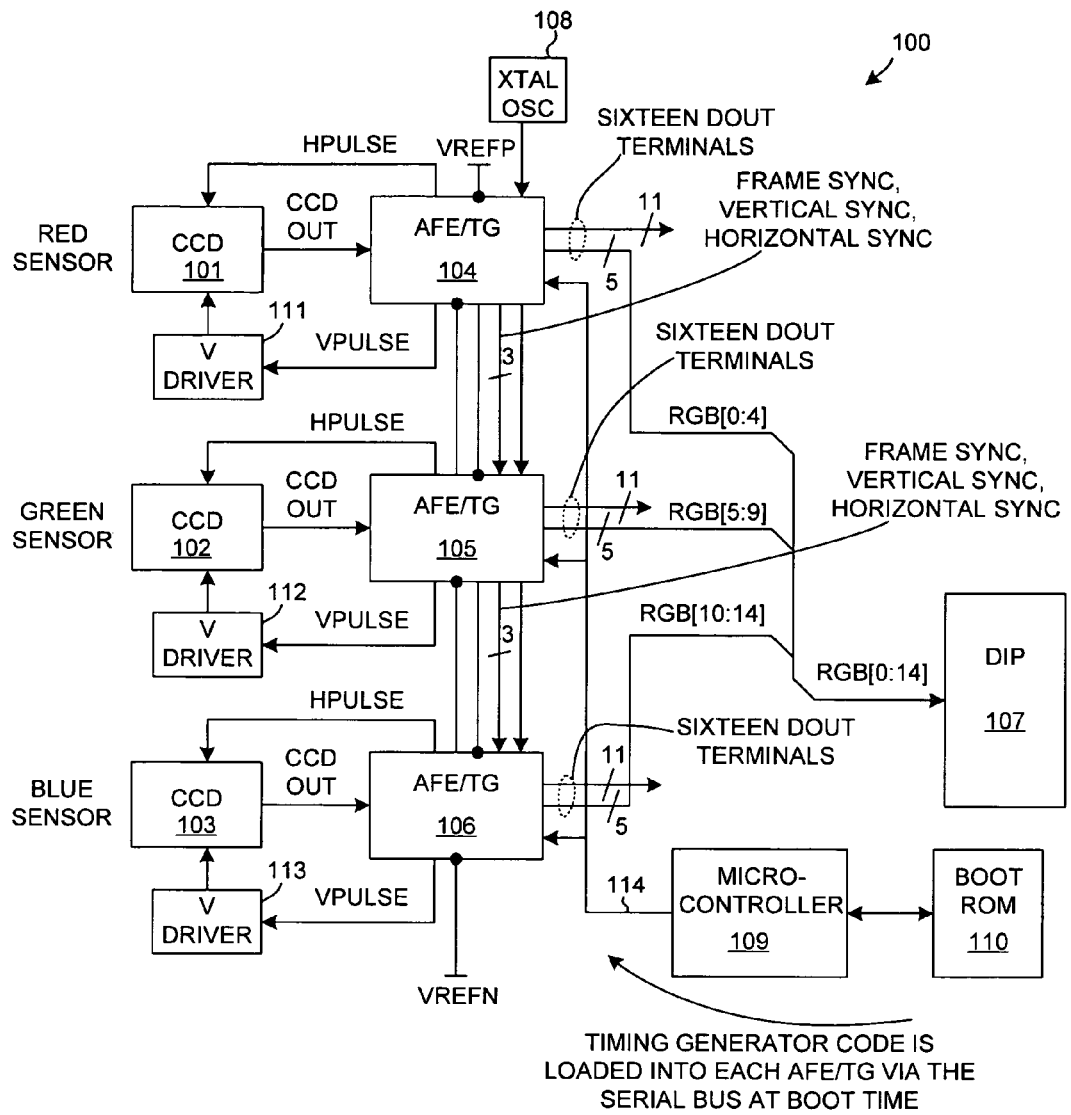
FIG. 11 is a simplified diagram of a digital image capture device in accordance with a first novel aspect. The digital image capture device employs three AFE/TG integrated circuits. Rather than employing additional multiplexing circuitry between the AFE/TGs and the DIP, the AFE/TG is designed to output digitized sample data such that no separate multiplexer circuitry is used. Each of the three AFE/TG integrated circuits outputs its digitized sample data truncated down to five bits. The first AFE/TG outputs its five-bit value onto the upper five bits of a parallel bus that extends to the DIP. The second AFE/TG outputs its five-bit value onto the next five bits of the parallel bus. The third AFE/TG outputs its five-bit value on the next five bits of the parallel bus. The three AFE/TG integrated circuits are synchronized so that they each output sample values onto the parallel bus at the same time. In this way, dedicated and relatively low-noise lines between the AFE/TG and the DIP are provided. These lines have relatively low loading and consequently can transfer data rapidly. In accordance with a second novel aspect, the AFE/TG integrated circuits include processors that execute programs such that when the programs execute, the AFE/TG integrated circuits output horizontal and vertical timing signals as defined by the software. At boot time, the software is loaded into the AFE/TGs via a serial bus. Special synchronization is provided so that the three AFE/TG integrated circuits can be made to execute code synchronously with each other.

FIG. 11 is a simplified block diagram of a digital camera 100 in accordance with one embodiment of the present invention. Camera 100 includes three image sensors 101-103, three analog front end and timing generator (AFE/TG) integrated circuits 104-106, a digital image processor (DIP) integrated circuit 107, a crystal oscillator 108, a microcontroller 109, and a boot read only memory (ROM) 110. Each AFE/TG 104-106 supplies vertical timing signals and horizontal timing signals to its associated image sensor. In the present example, horizontal timing signals are supplied directly to each image sensor 101-103. The vertical timing signals are, however, supplied to the image sensor via a vertical driver integrated circuit. Vertical drivers 111, 112 and 113 are the vertical drivers for AFE/TG integrated circuits 104, 105 and 106, respectively.

In the present example, image sensors 101-103 are charge coupled device (CCD) image sensors. Other types of image sensors such as, for example, CMOS image sensors can also be employed. In the present example, a vertical pulse is typically supplied to each image sensor 101-103 as part of a vertical timing signal. This causes each of the rows of sample charges captured in the image sensor to be shifted one row down. A series of horizontal pulses is then supplied to the image sensor as part of a horizontal timing signal. This causes the sample charges of the bottom row to be shifted out of the image sensor. In this fashion, the sample charges of all the sensors within an image sensor is shifted out of the image sensor in serial fashion. The sample charges that are output from an image sensor in the illustration are indicated with the label CCD OUT. There are many horizontal timing signals supplied to the image sensor. In the illustration, these signals are indicated with the label HPULSE. There are many vertical timing signals supplied to the image sensor. In the illustration, these signals are indicated with the label VPULSE.

Figure 1:
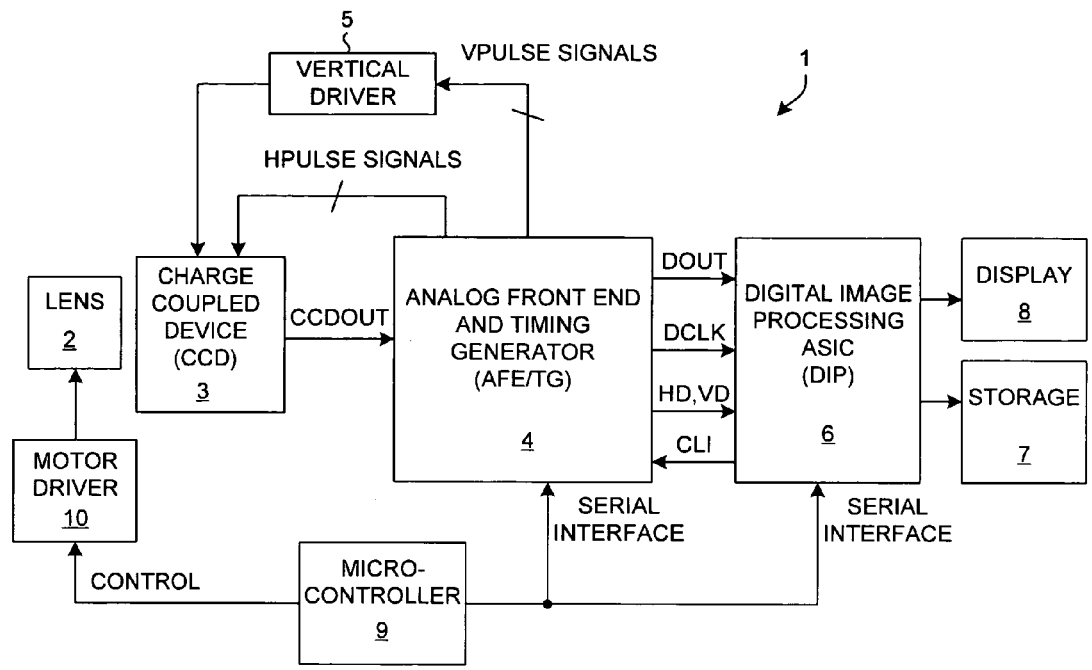
FIG. 1 (Prior Art) is a block diagram of a conventional consumer market digital still camera.
Figure 2:
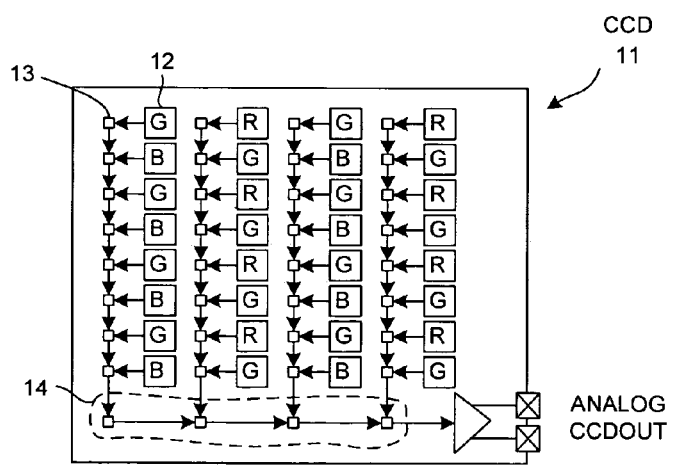
FIG. 2 (Prior Art) is a simplified diagram of a CCD image sensor.
Figure 7:
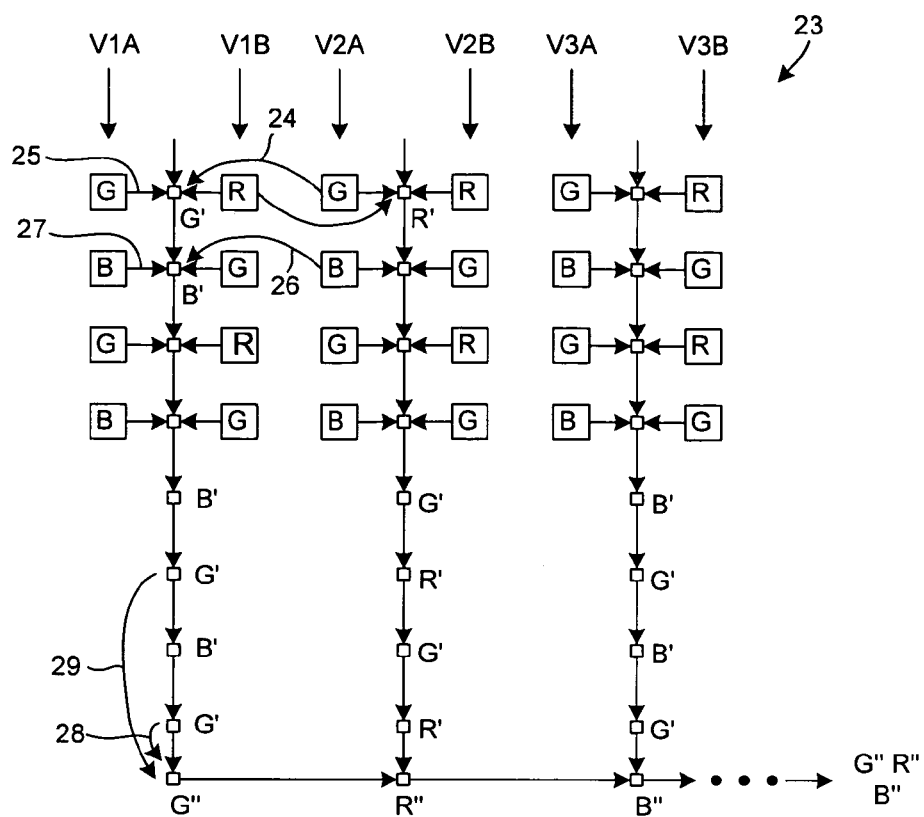
FIG. 7 (Prior Art) is a simplified diagram of an even more complex CCD image sensor that employs pixel mixing in a high-speed readout mode. Both horizontal and vertical mixing is employed.
Figure 8:
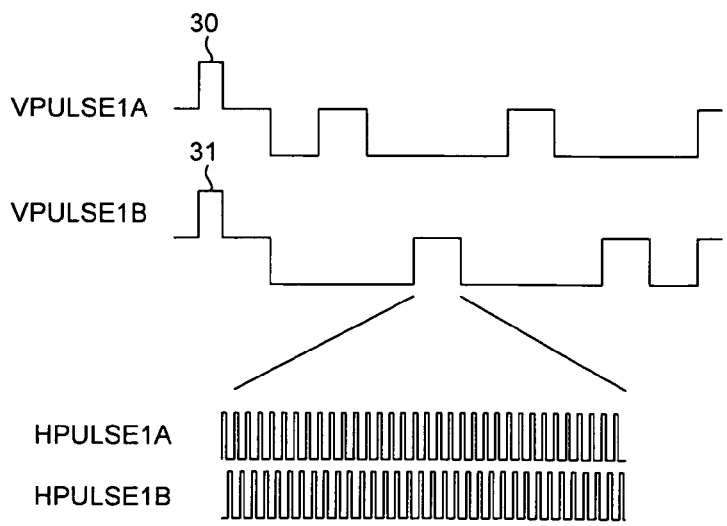
FIG. 8 (Prior Art) is a diagram of waveforms that cause the circuitry of FIG. 7 to shift sample charges in the vertical and horizontal directions.
Figure 9:
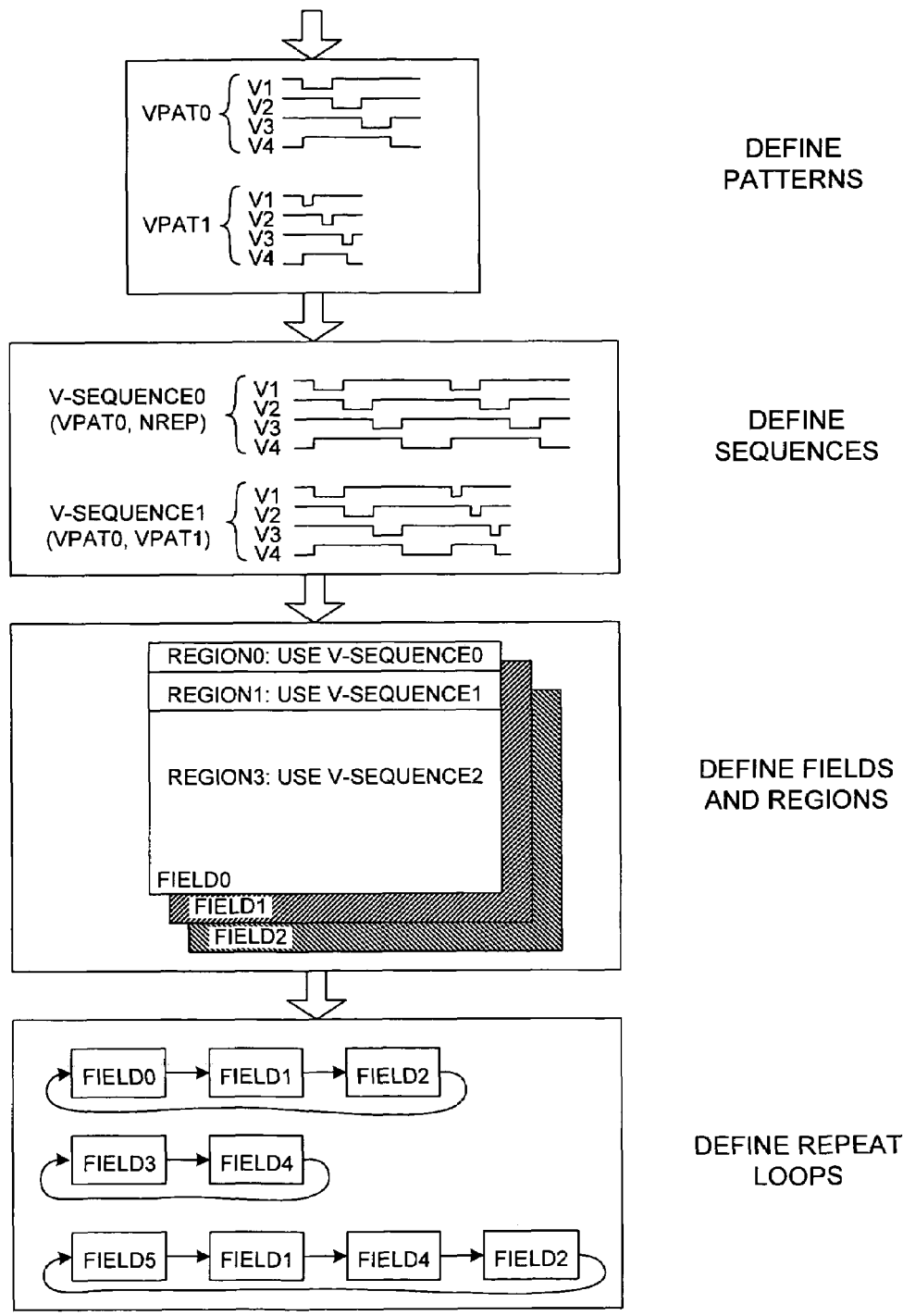
FIG. 9 (Prior Art) is a diagram that illustrates how a programmable AFE and timing generator of the prior art is programmed in order to output a desired set of vertical timing signals.
Figure 10:
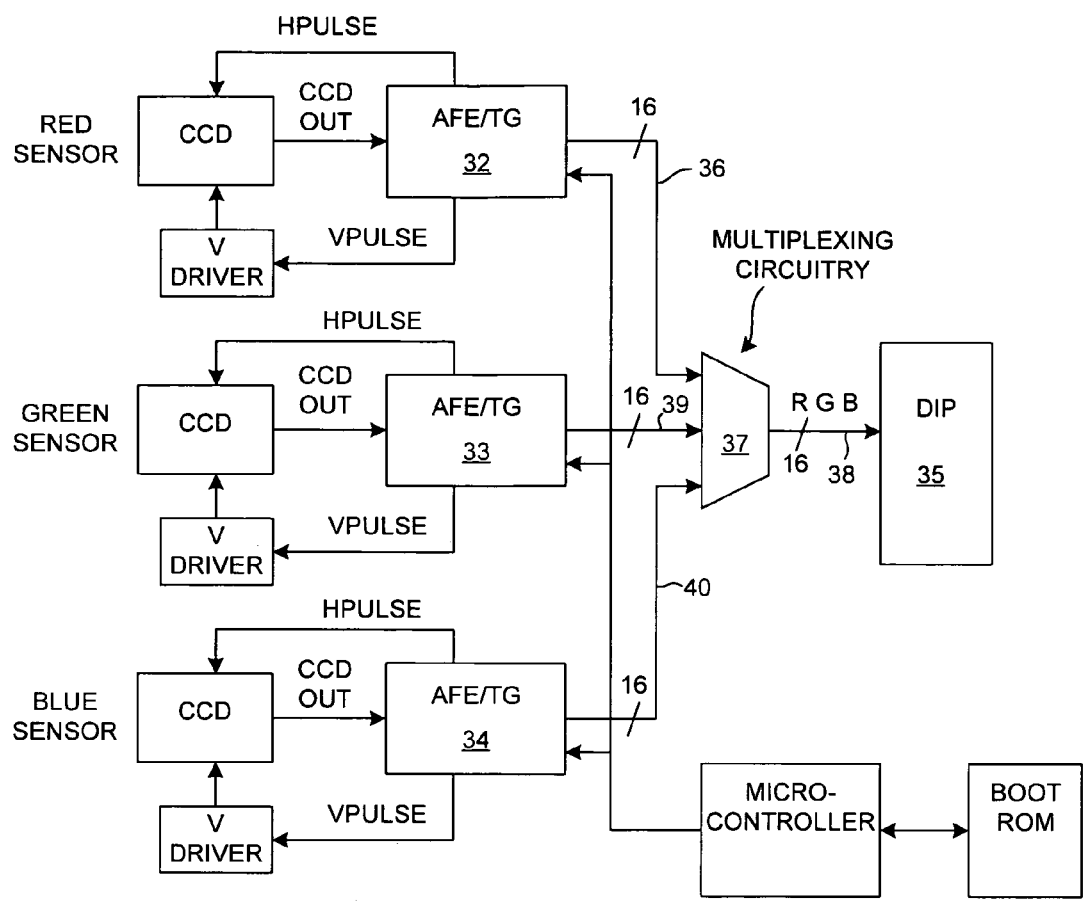
FIG. 10 (Prior Art) is a simplified diagram that illustrates a conventional way that multiple conventional AFE/TG integrated circuits are used to receive image data from multiple image sensors.

The AFE/TGs 104-106 digitize the incoming CCD OUT data and forward the resulting digitized sample values to DIP 107. Rather than supplying the digitized sample values to DIP 107 through multiplexing circuitry as set forth in FIG. 10, no multiplexing circuitry is provided. The multiplexing circuitry of FIG. 10 is often provided in the form of a separate integrated circuit (separate from the AFE/TGs and the DIP) and therefore increases component count in the camera and increases manufacturing cost.

In accordance with a first novel aspect, each AFE/TG integrated circuit 104-106 is an identical integrated circuit that has multiple output modes. A first output mode is for use in applications in which only one image sensor and one AFE/TG are used. In the first output mode, each successive digitized sample value is output from the AFE/TG as a single 16-bit value across sixteen DOUT output terminals. The single 16-bit value is communicated to the DIP as one word across a parallel bus. A second output mode is provided for use in applications in which multiple image sensors and multiple AFE/TGs are used. One example of such a multiple image sensor application is illustrated in FIG. 11.

In the second output mode, each successive digitized sample value is truncated and is output from the AFE/TG as a five-bit value. Each of the AFE/TG integrated circuits outputs its five-bit values to DIP 107 across a different five lines of a parallel bus. Each AFE/TG is therefore coupled to DIP 107 by a dedicated bus line that has reduced loading and therefore has high-speed data transmission ability. AFE/TG 104 outputs five-bit digitized sample values for red. These digitized sample values are communicated to DIP 107 across parallel bus lines RGB[0:4]. AFE/TG 105 outputs digitized sample values for green. These digitized sample values are communicated to DIP 107 across parallel bus lines RGB[5:9]. AFE/TG 106 outputs digitized sample values for blue. These digitized sample values are communicated to DIP 107 across parallel bus lines RGB[10:14]. The outputting of the five-bit digitized sample values onto parallel bus RGB[0:14] by AFE/TGs 104-106 is synchronized to a clock signal supplied by crystal oscillator 108 to each AFE/TG. Each of the AFE/TGs 104-106 outputs a five-bit value onto the RGB bus at the same time.

In accordance with a second novel aspect, each AFE/TG is an identical integrated circuit. Each AFE/TG integrated circuit includes a flexible timing generator that generates the horizontal and vertical timing signals needed to drive the associated image sensor. The flexible timing generator includes a processor that executes instructions. The instructions are stored in a program memory in the AFE/TG integrated circuit. At boot time or when the camera is first powered on, microcontroller 109 executes a boot program out of ROM 110. The boot program causes microcontroller 109 to read a timing generator program from ROM 110 and to load it into program memory in each of the AFE/TGs 104-106. Microcontroller 109 transfers the programs to the AFE/TGs via a serial bus 114 that is coupled to each AFE/TG. Once the timing generator programs have been loaded into the program memories of the three AFE/TGs 104-106, the processors within the AFE/TGs 104-106 access their respective programs and execute the programs. Execution of a program by an AFE/TG causes a particular set of horizontal and vertical timing signals to be output from the AFE/TG. The timing of the horizontal and vertical signals is determined by parameters set by software and by operation of the software itself.

If a different type of image sensor is to be used that requires a different set of horizontal and vertical timing signals, then the timing generator program can be modified. The modified timing generator program can be loaded into the various AFE/TGs 104-106 via the serial bus 114. Operation of the newly loaded timing generator program can then be tested, modified, reloaded and retested until camera operation with the different image sensor is satisfactory.

In the arrangement of FIG. 11, execution of code by an AFE/TG is initiated by a communication sent from microcontroller 109 across serial bus 114. Because only one AFE/TG can be communicated with at a time across the serial bus, starting the AFE/TGs 104-106 must be done one at a time. If one AFE/TG is started before another AFE/TG, then the two AFE/TG's will not be synchronized with one another as desired. In accordance with the first novel aspect, synchronization functionality is provided. AFE/TG 104 is a master, and AFE/TGs 105 and 106 are slaves. The master outputs three synchronization signals to the slaves: 1) a frame synchronization signal, 2) a vertical synchronization signal, and 3) a horizontal synchronization signal. Execution of the processors in the three AFE/TGs is started one-by-one using serial bus 114. The master AFE/TG outputs synchronization signals on a separate 3-bit bus, and the slave AFE/TGs use these signals to determine when to start outputting digitized sample values. The three AFE/TG devices can therefore be started one at a time, but can then be made to start operating synchronously with respect to one another.

Figure 12:
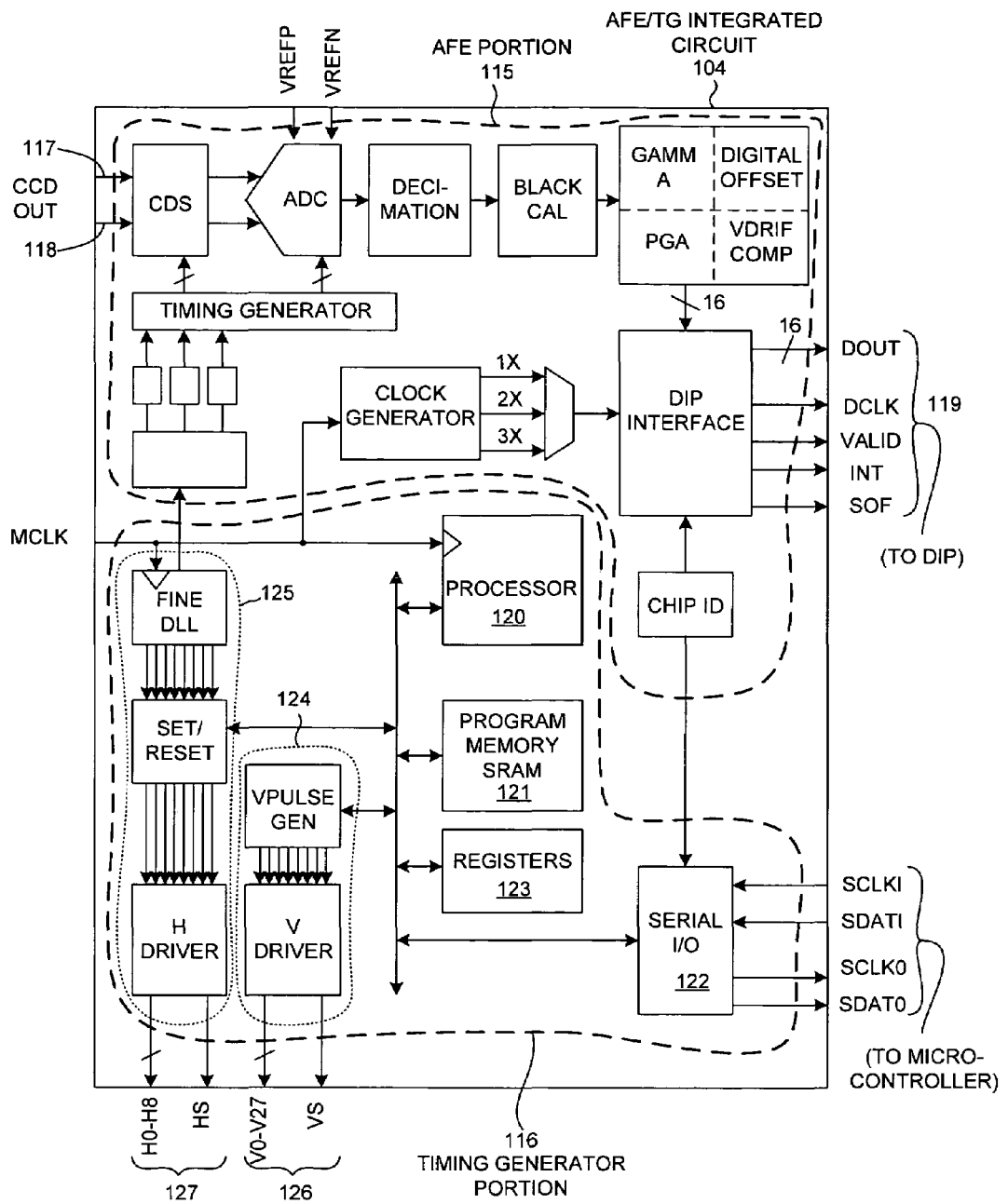
FIG. 12 is a more detailed block diagram of the AFE/TG integrated circuits of FIG. 11.

FIG. 12 is a more detailed block diagram of AFE/TG 104. AFE/TG 104 includes an analog front end portion 115 and a timing generator portion 116. The analog front end portion 115 receives analog sample information CCD OUT from image sensor 101 on input terminals 117 and 118. Analog front end portion 115 digitizes the CCD OUT information and outputs the digital result DOUT to DIP 107 via interface 119. Timing generator portion 116 includes a processor 120, a program memory 121, a serial interface 122, configuration and communication registers 123, vertical timing signal generation circuitry 124, and horizontal timing signal generation circuitry 125. Processor 120 executes a program stored in program memory 121. Execution of the program causes processor 120 to control the vertical and horizontal timing generators 124 and 125 such that vertical and horizontal timing signals required by image sensor 101 are output from terminals 126 and 127, respectively. At camera boot time, the program is loaded into the timing generator portion 116 via serial bus interface 122. Once the serial bus interface 122 has loaded the program into program memory 121, processor 120 is enabled such that processor 120 executes the program. The H driver block of the horizontal timing generator 125 represents high drive current I/O buffer circuitry. Although a V driver block is illustrated as being part of the AFE/TG integrated circuit in FIG. 12, the V driver functionality is generally realized outside the AFE/TG integrated circuit in the form of a separate V driver integrated circuit.

Figure 13:
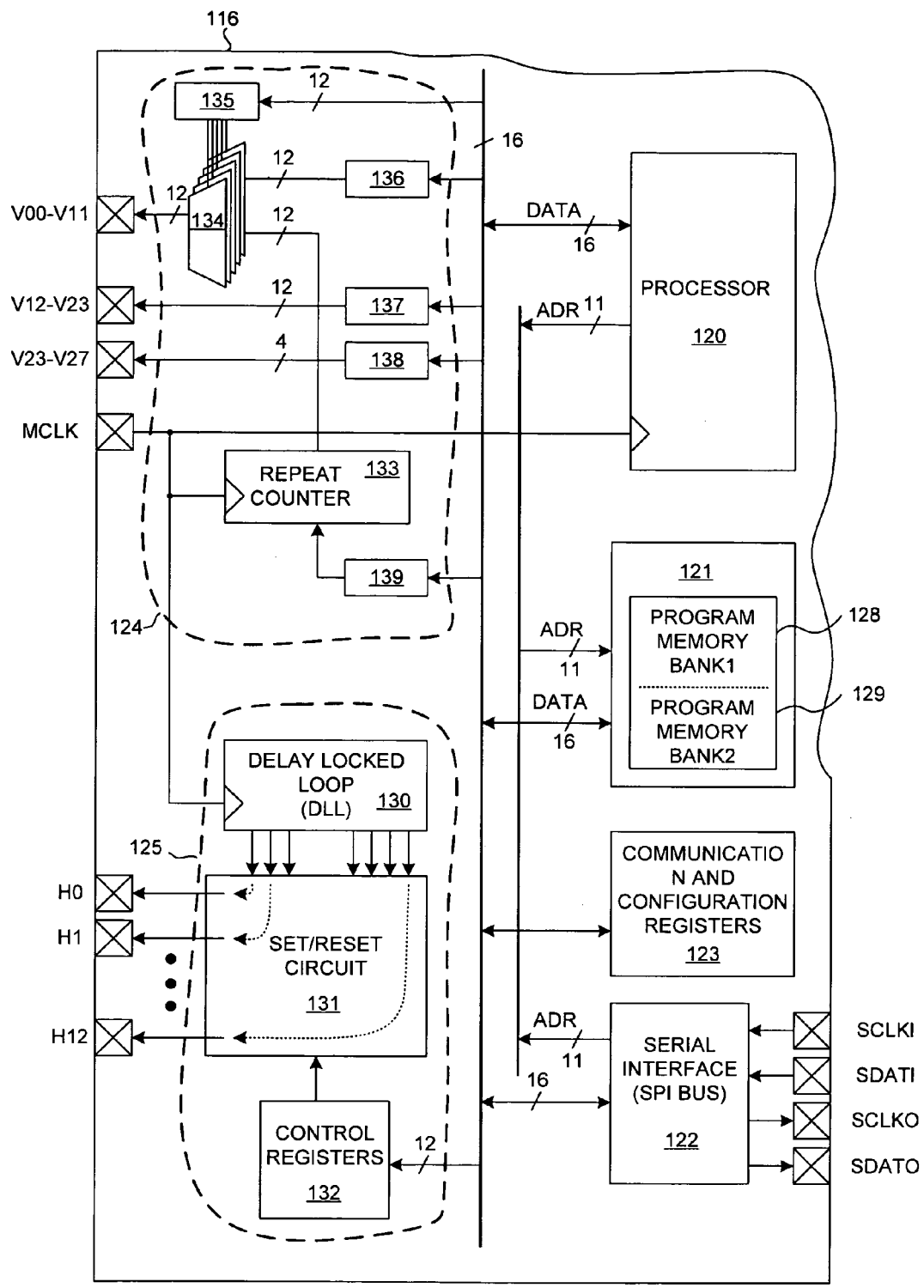
FIG. 13 is a more detailed block diagram of the timing generator portion of the AFE/TG integrated circuit of FIG. 12.

FIG. 13 is a more detailed block diagram of timing generator portion 116. Processor 120 fetches 16-bit instructions from program memory 121 via address bus ADR and data bus DATA. The 16-bit instructions have a variable number of opcode bits. The instruction set includes basic one-operand and two-operand operations, branch operations (conditional or unconditional), a function call (no parameter passed), a function return operation, and a while loop operation. All operations are unsigned operations. An eight-level deep function call stack is supported. All the instructions (except the special bank_return instruction, which takes two MCLK cycles) execute in a single clock cycle of MCLK. This allows the execution of the processor in relation to MCLK to be easily predicted and therefore facilitates the control of the vertical and horizontal timing generator circuitry at the correct times. A single delay(n) instruction is provided, which when executed causes a delay of n MCLK cycles.

Program memory 121 includes two single-port SRAM banks 128 and 129. Processor 120 can execute instructions out of either bank. Two bits in communication and configuration registers 123 indicate whether the processor is disabled, and which bank the processor has access to. Upon power up, the bits are set such that processor 120 is disabled and such that processor 120 has access to bank 1. The serial interface 122 can therefore access bank 2. Serial interface 122 can read from any of the registers of the timing generator portion 116 across the address and data bus. Accordingly, the microcontroller 109 (see FIG. 11) external to the AFE-TG can transfer a program into SRAM bank 129 via serial interface 122. Once the program has been loaded, then microcontroller 109 causes serial interface 122 to write to the two bits in communication and configuration registers 123 such that the SRAM bank accessed by the processor switches from bank 128 to bank 129 and such that the processor is enabled. Processor 120 then executes the newly loaded code out of bank 129. Once the processor is enabled, serial interface 122 is prevented from writing to the registers of the vertical and horizontal timing generators. The serial interface 122 can, however, provide information to timing generator portion 116 by writing to certain registers of communication and configuration registers 123. The information loaded into the communication and configuration registers 123 by the serial interface 122 can be accessed and used by software being executed by processor 120. The information passed to the AFE/TG in this manner can, for example, provide instructions on how to adjust the timing signals to achieve stability control to help combat the effects of the user moving the camera during the capture of video. Serial interface 122 can also write to the two bits in the configuration and communication registers 123, stop processor 120, and take back control of timing generator portion 116.

Horizontal timing generator 125 includes a fine delay locked loop (DLL) 130, a set/reset portion 131, and a plurality of control registers 132. DLL receives clock signal MCLK that is clocking processor 120. DLL generates sixty-four versions of MCLK, each delayed slightly with respect to the next. These delayed versions of MCLK are supplied to set/reset portion 131. Each of the horizontal timing signal terminals H0-H12 to be driven has a corresponding register within registers 132. This register includes a set number and a reset number. The set number defines which one of the sixty-four versions of MCLK, the rising edge of which will determine when a set-reset latch is set. The reset number defines which one of the sixty-four versions of MCLK, the rising edge of which will determine when the set-reset latch is reset. The output of the set-reset latch is then used as the signal that is supplied to the horizontal timing signal terminal.

Figure 14:
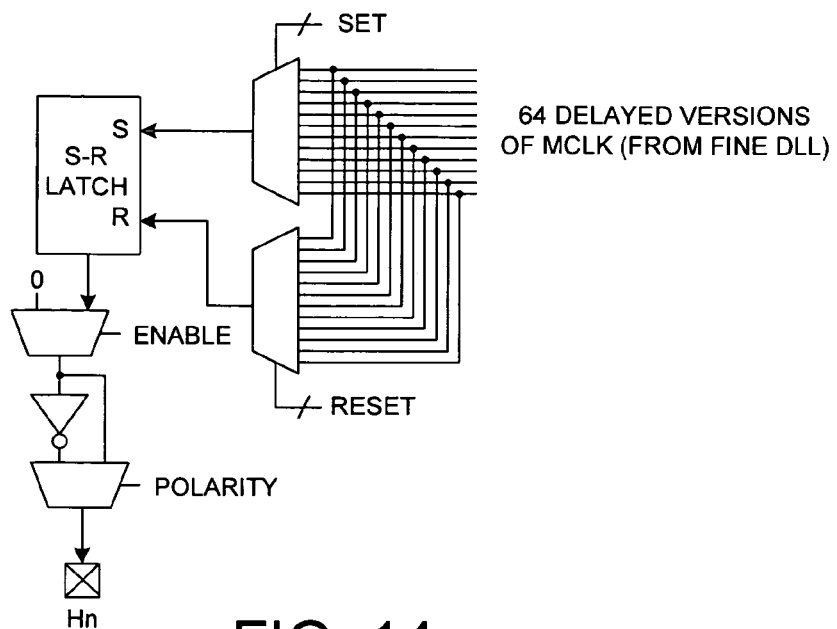
FIG. 14 is a simplified circuit diagram of part of the circuitry of the horizontal timing generator circuitry of the timing generator portion of FIG. 13.

FIG. 14 illustrates circuitry of set/reset portion 131 of FIG. 13. The circuitry of FIG. 14 is replicated once for each of the thirteen horizontal timing signal terminals H0-H13 to be driven. The control registers 132 of the horizontal timing generator 125 also include an enable bit and a polarity bit for each of the thirteen terminals H0-H12. FIG. 14 illustrates how these bits are used to enable the horizontal timing signal and to control the polarity of the horizontal timing signal. When one of the registers of control registers 132 is written, it is written synchronously with respect to MCLK. The horizontal timing generator 125 takes action based on the new contents of the register on the next cycle of MCLK.

In accordance with a third novel aspect, a processor of a programmable AFE/TG uses a DLL and associated set and reset circuitry to generate timing signals with precisely controlled rising and falling edges, wherein the resolution at which the rising and falling edges are controlled is substantially greater than the period of the clock signal MCLK that is clocking the processor. A rising or falling edge of a horizontal timing signal may, for example, be adjustable in 25 nanosecond increments, whereas the processor controlling the AFE/TG is being clocked by a relatively slow clock signal having a period that is one, two or more orders of magnitude greater than the adjustable increment.

Control registers 132 also contain, for each horizontal timing signal terminal, a control bit that indicates a drive strength. The control bit is supplied to an H driver block (not shown) disposed between the set/reset portion 131 and the horizontal timing signal terminals. In an alternative embodiment, the H driver is disposed outside the AFE/TG integrated circuit. Control registers 132 also contains a bit that when set causes four of the registers storing set numbers and reset numbers to be used in combination to output four-phase horizontal timing signals. Control registers 132 also contain bits that when set cause selected ones of the horizontal timing signal terminals and any associated drive circuitry to be powered down.

Figure 15:
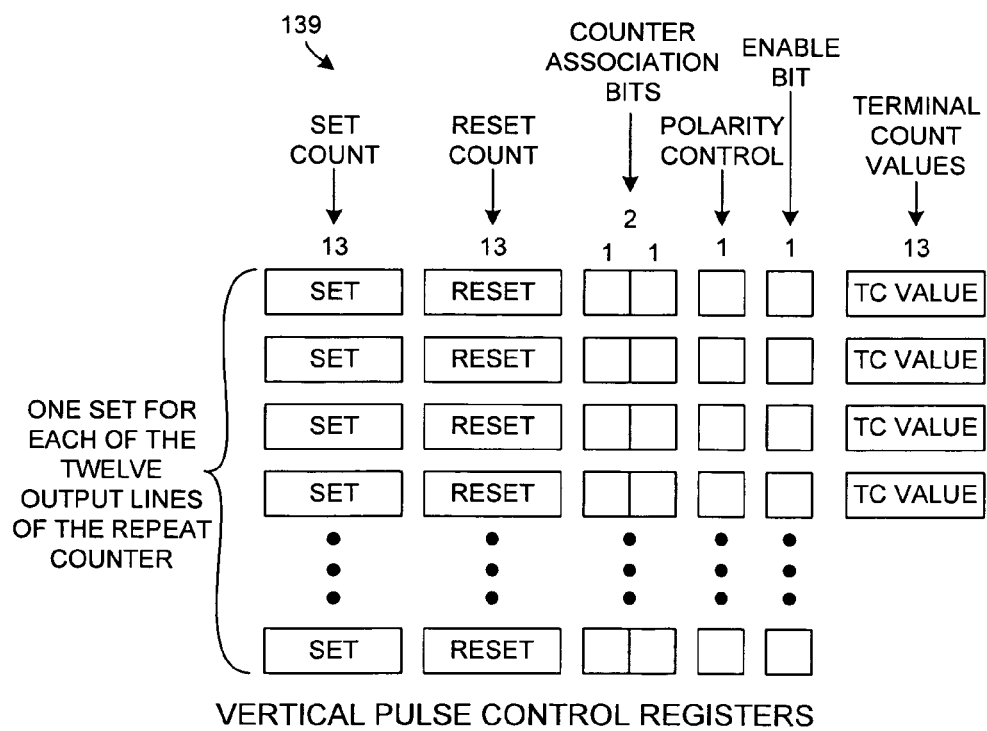
FIG. 15 is an illustration of the registers usable to control how the vertical timing generator portion operates to generate customized timing signals.

Vertical timing circuitry 124 includes a repeat counter 133, a set of multiplexers 134, and a set of control registers 135-139. FIG. 15 is an illustration of the registers 139 usable to control how the vertical timing generator portion 124 operates to generate customized timing signals. Repeat counter 133 actually includes four counters. Each of the counters counts up to a terminal count value, and then rolls over and continues counting up. Processor 120 can determine the terminal count values for the four counters by loading four 13-bit terminal count values shown at the right of FIG. 15.

Registers block 139 includes twelve sets of registers. Each set includes a set count value, a reset count value, a pair of counter association bits, a polarity control bit, and an enable bit. Each set is associated with a respective one of the vertical timing signal terminals V00-V11. The set count value indicates the count at which the signal is to be set. The reset count value indicates the count at which the signal is to be reset. The counter association bits indicate to which one of the four counters the set and reset values refer. Processor 120 can write each of the values of FIG. 15 in order to define vertical timing signals output by the repeat counter block 133. Accordingly, the bus extending out of repeat counter block 133 in FIG. 13 has twelve bits. Register 135 can be set on a bit by bit basis to either couple a bit of the repeat counter output to its associated vertical timing signal terminal or to couple one of the output bits of register 136 to the vertical timing signal terminal.

In operation, processor 120 sets up the vertical timing generator 124 by writing appropriate values into registers 135-139. Once these registers are set up, then processor 120 sets the enable bit for a desired output terminal. Setting this bit causes the vertical timing generator 124 to generate a vertical timing signal with a desired timing. The vertical timing signal is output onto the associated vertical timing signal terminal.

Configuration and communication registers 123 include, in addition to the bits set forth above, a register for passing information from the DIP to the AFE/TG. A similar register is provided for passing information in the other direction from AFE/TG to DIP. Configuration and communication registers 123 also include an H-V swapping register. The register includes one bit for each of a plurality of the horizontal timing signal terminals. Each of these terminals is associated with a respective one of the vertical timing signal terminals. When the bit associated with the horizontal timing signal terminal is set, then the signal on the corresponding vertical timing signal terminal will be output from the horizontal timing signal terminal and visa versa. A H-V swap enable bit is provided. When this H-V bit is asserted, then the swapping indicated by the swap bits is enabled.

EXAMPLE

FIG. 16 sets forth source code of a program. The source code program is compiled into object code. The object code is then loaded into AFE/TG 104 via serial interface 122 and is executed by processor 120. Execution causes AFE/TG integrated circuit 104 to generate the horizontal and vertical timing signals of FIG. 17 for the "readout" mode of an image sensor similar to the ICX452AQ CCD Image sensor available from Sony Corporation. A "dataout" mode waveform is performed once to transfer charge from the CCD sensors to their associated storage elements. After the "readout" mode waveform has been applied, then a subsequent "dataout" mode waveform of FIG. 17 is performed to read the data out of the CCD sensor. The "dataout" mode waveform is therefore performed multiple times such that row by row of image data is output from the CCD sensor. In the present example, the CCD sensor has 224 rows (a row is called a "line" in the code of FIG. 16).

Consider the generation of two identical horizontal timing signals H1A and H1B. First, the set number and the reset number associated with the H1 horizontal timing signal terminal are programmed. This occurs at line 200. The values 47 and 16 are loaded into different parts of general purpose register GP3. Then in line 201 the content of general purpose register GP3 is loaded into special register SP1. Special register SP1 is the register within control registers 132 of FIG. 13 that holds the set number and the reset number for the horizontal timing terminal H1.

Once this initialization is complete, execution of the main program at line 202 begins. Bit 0 of the AUX0 register of communication and configuration registers 132 contains a flag. This flag indicates whether the camera is to operate in the high frame dataout mode or not. Accordingly, the UNTIL (AUX0[0]) of line 203 causes the next block of code (that ends at the subroutines) to be repeated over and over as long as the flag bit indicates operation is to remain in the high frame dataout mode.

Next, it is desired to enable the horizontal timing signal H1. As set forth above, each horizontal timing signal terminal has an associated enable bit in one of the control registers 132. This register is denoted AUX3. Accordingly, the bit in GP3 corresponding to H1 is set in line 204, and the content of register GP3 is transferred in line 205 to AUX3 to set the desired enable bit for H1.

For this CCD sensor, the vertical synchronization signal VD is to start off set. This is accomplished at line 206. There may be undesirable residual charge in the CCD sensor at this time. Consequently a single "dataout_line" subroutine operation is performed to clear out any such garbage that might be present in the CCD sensor before the charge transfer is performed. The single "dataout_line" is performed at line 207 by calling the subroutine "dataout_line". The subroutine "dataout_line" starts at line 208.

FIG. 17 illustrates the desired waveforms of the "dataout_line" subroutine. Note that the horizontal timing signals H1A and H1B are active (enabled) initially, and then are disabled at MCLK number 44. After a delay (42) operation is performed in line 211, the enable bits in AUX3 corresponding to the H1 and H2 timing signal terminals are reset in line 212. The resetting of these bits takes effect in the next MCLK cycle, which is clock cycle 44. H1A and H1B are therefore disabled at MCLK 44 as indicated in FIG. 17.

After a series of operations that cause other timing signals to change values, the enable bits in AUX3 that correspond to the H1 and H2 timing signals are again set in line 213. As indicated, the enabling of H1 and H2 takes effect at the next MCLK (MCLK 980) as desired in the waveform of FIG. 17.

After the waveforms of FIG. 17 have been generated, execution proceeds to line 209. In line 209, the data "readout_line" subroutine is called. This routine causes timing signals to be supplied to the CCD sensor such that sample charges are transferred from the sensors to the storage elements of the CCD. The "readout_line" subroutine starts at line 219. At line 214, a count value of six is loaded into register RGP3. This count value is used in line 215 to loop through line 216 until CCD row 10 is reached. According to the CCD sensor requirements, the vertical synch signal is to reset at this point in the frame. At line 217, the register bit in register GP0 that corresponds to the vertical synchronization signal VD is reset. The "dataout_line" subroutine is then called again in a loop until row 244 is reached. If operation is to continue in the high-speed readout mode, then the flag bit AUX0[0] will still be set. If AUX0[0] is set, then the goto statement of line 218 causes the entire process to be repeated.

In the example of FIG. 17, the vertical timing signals are generated without using repeat counter 133. Rather, the bits in the registers associated with the vertical timing signal terminals are merely set and reset at the MCLK cycle numbers necessary to generate the waveform of FIG. 17. For each output terminal, there is an associated bit in a writable register. The contents of the bit in the register is coupled via a hardwired connection to the output terminal. To cause the signal on the output terminal to transition, the processor 120 writes an appropriate value into the bit of the register.

In FIG. 13, register 135 is loaded such that multiplexers couple the twelve bits of register 136 to twelve respective output terminals V00-V11. To set vertical timing signal V1 high, processor 120 writes the corresponding bit in register 136 one MCLK cycle before the high transition is to occur in vertical timing signal V1. On the next MCLK, the high transition of the vertical timing signal V1 on output terminal V01 transitions high.

In the example of FIG. 16, the actual V1 timing signal is a ternary signal that is to have three voltage levels. A V driver chip external to the AFE/TG receives two bits as control as well as three voltage supplies, −8V, 0V and +15V. The driver chip uses these two bits to generate the ternary output signal V1. In the example of FIG. 16, the two bits that control the external V driver chip are set or reset by writing to bit 0 of register GP0 and bit 0 of register GP1. Registers GP0 and GP1 correspond to register 136 in the illustration of FIG. 13. The other vertical timing signals needed are generated in similar fashion by writing to bits in registers associated with those other vertical timing signals.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A circuit that generates a timing signal, the timing signal being for driving an image sensor, the circuit comprising:
    a terminal;
    a memory;
    a processor that executes a program of instructions stored in the memory, wherein execution of the program causes the timing signal to be generated and output from the terminal;
    a horizontal timing generator that outputs the timing signal, the timing signal having signal edges that are adjustable to within an amount of time, and wherein the processor is clocked by a clock signal having a period, the period of the clock signal being substantially longer than the amount of time; and
    a vertical timing signal generator that outputs a vertical timing signal, wherein the vertical timing signal generator comprises:
        a plurality of counters; and
        a register that stores a first count value, a second count value, and a third value, wherein the first count value identifies a count associated with a first edge of the vertical timing signal, wherein the second count identifies a count associated with a second edge of the vertical timing signal, and wherein the third value identifies a selected one of the plurality of counters, wherein the processor writes the first count value, the second count value and the third value into the register.

2. The circuit of claim 1, wherein the circuit is part of an analog front end and timing generator (AFE/TG) integrated circuit, the AFE/TG integrated circuit supplying the timing signal to the image sensor.

3. The circuit of claim 1, wherein the processor determines a timing of one of the signal edges of the timing signal by loading a value into a control register.

4. The circuit of claim 3, wherein the control register includes a polarity control bit the value of which determines a polarity of the timing signal.

5. The circuit of claim 1, wherein the circuit is part of an analog front end and timering generator (AFE/TG) integrated circuit of a digital camera, the AFE/TG having a first output mode and a second output mode, the AFE/TG outputting a stream of digitized sample values in the first output mode, the AFE/TG outputting a stream of truncated sample values in the second output mode.

6. The circuit of claim 5, wherein the digital camera comprises a plurality of identical AFE/TGs, and wherein one of the AFE/TGs is a master AFE/TG.

7. The circuit of claim 6, wherein the master AFE/TG outputs a synchronous signal such that each one of the plurality of AFE/TGs operates synchronously with respect to one another in outputting the stream of truncated sample values in the second output mode.

8. The circuit of claim 1, wherein the vertical timing signal generator includes a repeat counter that continues counting up to a terminal count value.

9. The circuit of claim 1, wherein the register includes a polarity control bit the value of which determines a polarity of the vertical timing signal.

* * * * *